(12) United States Patent
Zhao et al.

(10) Patent No.: US 8,320,448 B2
(45) Date of Patent: Nov. 27, 2012

(54) ENCODER WITH MULTIPLE RE-ENTRY AND EXIT POINTS

(75) Inventors: Weidong Zhao, Bellevue, WA (US); Thomas W. Holcomb, Redmond, WA (US); Chih-Lung B Lin, Redmond, WA (US); William R. Sanders, Redmond, WA (US); Shijun Sun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 909 days.

(21) Appl. No.: 12/324,987

(22) Filed: Nov. 28, 2008

(65) Prior Publication Data

US 2010/0135383 A1    Jun. 3, 2010

(51) Int. Cl.
*H04N 7/12* (2006.01)
*H04B 1/66* (2006.01)

(52) U.S. Cl. ................... 375/240.02; 375/240
(58) Field of Classification Search ............. 375/240.02, 375/240

See application file for complete search history.

(56) References Cited

U.S. PATENT DOCUMENTS

| | | | |
|---|---|---|---|
| 5,798,770 A * | 8/1998 | Baldwin | 345/506 |
| 6,816,904 B1 | 11/2004 | Ludwig et al. | |
| 2003/0088877 A1 | 5/2003 | Loveman | |
| 2004/0028141 A1 | 2/2004 | Hsiun et al. | |
| 2004/0125103 A1* | 7/2004 | Kaufman et al. | 345/419 |
| 2005/0188364 A1* | 8/2005 | Cockx et al. | 717/159 |
| 2007/0050603 A1* | 3/2007 | Vorbach et al. | 712/221 |
| 2007/0201562 A1 | 8/2007 | Ganesh et al. | |
| 2009/0002379 A1* | 1/2009 | Baeza et al. | 345/522 |
| 2009/0003447 A1 | 1/2009 | Christoffersen et al. | |

OTHER PUBLICATIONS

"DirectX Video Acceleration," Wikipedia description associated with Windows Media Video Encoder Acceleration API, downloaded Jul. 3, 2009 (but some form of Windows Media Video Encoder Accelerator API was available prior to Applicant's filing date), 7 pages.
Kim et al., "Hardware-Software Implementation of MPEG-4 Video Codec," *ETRI Journal*, vol. 25, No. 6, Dec. 2003, pp. 489-502.
"Mobile Encoder," 2006 © Harmonic, Inc., 2 pages.
Wang et al., "A Platform-Based MPEG-4 Advanced Video Coding (AVC) Decoder with Block Level Pipelining," *ICICS-PCM 2003*, Dec. 15-18, 2003, pp. 51-55.
"Xenon™ Live Encoder," Copyright © 2008 Vidiator, 1 page.

* cited by examiner

*Primary Examiner* — Techane Gergiso
(74) *Attorney, Agent, or Firm* — Klarquist Sparkman, LLP

(57) ABSTRACT

An encoder is disclosed that is partitioned into discrete hardware modules. The discrete modules include multiple re-entry and exit points that allow enhanced control by software. The software can control the discrete modules during the encoding process and make adjustments according to CPU bandwidth and/or user requirements allowing for enhanced quality control and seamless hardware/software operations. In one embodiment, a media stream is received into an encoder that includes a pipeline of multiple hardware stages for encoding. An intermediate result is provided from at least one of the hardware stages to an encoding control module that processes the intermediate result to determine configuration instructions for a next hardware stage in the pipeline. Thus, the encoding process can be modified dynamically through hardware and software interactions as the media stream progresses through the pipeline of the encoder.

17 Claims, 10 Drawing Sheets software 180 implementing one or more multithreaded multiple entry/exit point encoding control modules

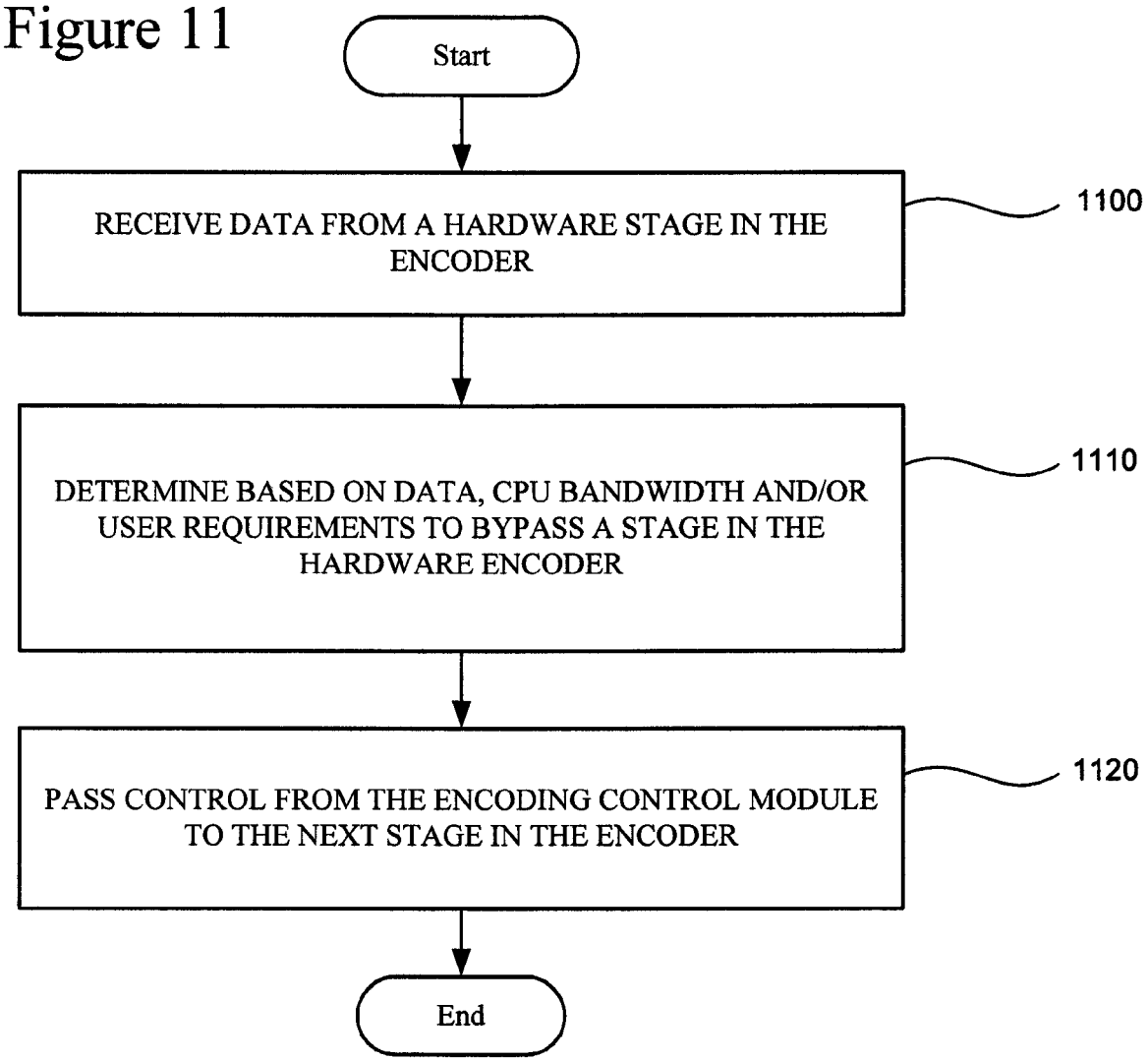

ENCODER WITH MULTIPLE RE-ENTRY AND EXIT POINTS

BACKGROUND

Companies and consumers increasingly depend on computers to process, distribute, and play back high quality video content. Engineers use compression (also called source coding or source encoding) to modify the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Compression can be lossless, in which the quality of the video does not suffer, but decreases in bit rates are limited by the inherent amount of variability (sometimes called source entropy) of the input video data. Or, compression can be lossy, in which the quality of the video suffers, and the lost quality cannot be completely recovered, but achievable decreases in bit rate are more dramatic. Lossy compression is often used in conjunction with lossless compression—lossy compression establishes an approximation of information, and the lossless compression is applied to represent the approximation.

A basic goal of lossy compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bit rate changes also affect decisions made in codec design as well as decisions made during actual encoding.

In general, video compression techniques include "intra-picture" compression and "inter-picture" compression. Intra-picture compression techniques compress a picture with reference to information within the picture, and inter-picture compression techniques compress a picture with reference to a preceding and/or following picture (often called a reference or anchor picture) or pictures.

For intra-picture compression, for example, an encoder splits a picture into 8×8 blocks of samples, where a sample is a number that represents the intensity of brightness or the intensity of a color component for a small, elementary region of the picture, and the samples of the picture are organized as arrays or planes. The encoder applies a frequency transform to individual blocks. The frequency transform converts an 8×8 block of samples into an 8×8 block of transform coefficients. The encoder quantizes the transform coefficients, which may result in lossy compression. For lossless compression, the encoder entropy codes the quantized transform coefficients.

Inter-picture compression techniques often use motion estimation and motion compensation to reduce bit rate by exploiting temporal redundancy in a video sequence. Motion estimation is a process for estimating motion between pictures. For example, for an 8×8 block of samples or other unit of the current picture, the encoder attempts to find a match of the same size in a search area in another picture, the reference picture. Within the search area, the encoder compares the current unit to various candidates in order to find a candidate that is a good match. When the encoder finds an exact or "close enough" match, the encoder parameterizes the change in position between the current and candidate units as motion data (such as a motion vector ("MV")). In general, motion compensation is a process of reconstructing pictures from reference picture(s) using motion data.

The example encoder also computes the sample-by-sample difference between the original current unit and its motion-compensated prediction to determine a residual (also called a prediction residual or error signal). The encoder then applies a frequency transform to the residual, resulting in transform coefficients. The encoder quantizes the transform coefficients and entropy codes the quantized transform coefficients.

If an intra-compressed picture or motion-predicted picture is used as a reference picture for subsequent motion compensation, the encoder reconstructs the picture. A decoder also reconstructs pictures during decoding, and it uses some of the reconstructed pictures as reference pictures in motion compensation. For example, for an 8×8 block of samples of an intra-compressed picture, an example decoder reconstructs a block of quantized transform coefficients. The example decoder and encoder perform inverse quantization and an inverse frequency transform to produce a reconstructed version of the original 8×8 block of samples.

As another example, the example decoder or encoder reconstructs an 8×8 block from a prediction residual for the block. The decoder decodes entropy-coded information representing the prediction residual. The decoder/encoder inverse quantizes and inverse frequency transforms the data, resulting in a reconstructed residual. In a separate motion compensation path, the decoder/encoder computes an 8×8 predicted block using motion vector information for displacement from a reference picture. The decoder/encoder then combines the predicted block with the reconstructed residual to form the reconstructed 8×8 block.

I. Video Codec Standards.

Over the last two decades, various video coding and decoding standards have been adopted, including the H.261, H.262 (MPEG-2) and H.263 series of standards and the MPEG-1 and MPEG-4 series of standards. More recently, the H.264 standard (sometimes referred to as AVC or JVT) and VC-1 standard have been adopted. For additional details, see representative versions of the respective standards.

Such a standard typically defines options for the syntax of an encoded video bit stream according to the standard, detailing the parameters that must be in the bit stream for a video sequence, picture, block, etc. when particular features are used in encoding and decoding. The standards also define how a decoder conforming to the standard should interpret the bit stream parameters—the bit stream semantics. In many cases, the standards provide details of the decoding operations the decoder should perform to achieve correct results. Often, however, the low-level implementation details of the operations are not specified, or the decoder is able to vary certain implementation details to improve performance, so long as the correct decoding results are still achieved.

During development of a standard, engineers may concurrently generate reference software, sometimes called verification model software or JM software, to demonstrate rate-distortion performance advantages of the various features of the standard. Typical reference software provides a "proof of concept" implementation that is not algorithmically optimized or optimized for a particular hardware platform. Moreover, typical reference software does not address multithreading implementation decisions, instead assuming a single threaded implementation for the sake of simplicity.

II. Acceleration of Video Decoding and Encoding

While some video decoding and encoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit rate video (e.g., compressed high-definition video). In particular, decoding tasks according to more recent standards such as H.264 and VC-1 can be computationally intensive and consume significant memory resources.

Some decoders use video acceleration to offload selected computationally intensive operations to a graphics processor. For example, in some configurations, a computer system includes a primary central processing unit ("CPU") as well as a graphics processing unit ("GPU") or other hardware specially adapted for graphics processing. A decoder uses the primary CPU as a host to control overall decoding and uses the GPU to perform simple operations that collectively require extensive computation, accomplishing video acceleration.

In a typical software architecture for video acceleration during video decoding, a video decoder controls overall decoding and performs some decoding operations using a host CPU. The decoder signals control information (e.g., picture parameters, macroblock parameters) and other information to a device driver for a video accelerator (e.g., with GPU) across an acceleration interface.

The acceleration interface is exposed to the decoder as an application programming interface ("API"). The device driver associated with the video accelerator is exposed through a device driver interface ("DDI"). In an example interaction, the decoder fills a buffer with instructions and information then calls a method of an interface to alert the device driver through the operating system. The buffered instructions and information, opaque to the operating system, are passed to the device driver by reference, and video information is transferred to GPU memory if appropriate. While a particular implementation of the API and DDI may be tailored to a particular operating system or platform, in some cases, the API and/or DDI can be implemented for multiple different operating systems or platforms.

In some cases, the data structures and protocol used to parameterize acceleration information are conceptually separate from the mechanisms used to convey the information. In order to impose consistency in the format, organization and timing of the information passed between the decoder and device driver, an interface specification can define a protocol for instructions and information for decoding according to a particular video decoding standard or product. The decoder follows specified conventions when putting instructions and information in a buffer. The device driver retrieves the buffered instructions and information according to the specified conventions and performs decoding appropriate to the standard or product. An interface specification for a specific standard or product is adapted to the particular bit stream syntax and semantics of the standard/product.

A conventional hardware encoder allows one acceleration entry point and exit point. For example, a main software module can activate, at the entry point, a motion-estimation accelerator to provide a motion vector field at the exit point. Alternatively, the main software module can activate, at the entry point, a fully accelerated video encoder to encode one picture and provide bit streams at the exit point. Thus, the encoder allows for little control so that the input follows a single, predetermined path to the output.

Unfortunately, video encoding process can involve very complex operations with strong data dependencies. As a result, a predetermined encoder accelerator should not be expected to deliver very high compression quality.

Greater flexibility is needed in the encoder in order to optimize acceleration.

SUMMARY

An encoder is disclosed that is partitioned into discrete hardware modules. The discrete modules include multiple re-entry and exit points that allow enhanced control by software. The software can control the discrete modules during the encoding process and make adjustments according to CPU bandwidth and/or user requirements allowing for enhanced quality control and seamless hardware/software operations.

In one embodiment, a media stream is received into an encoder that includes a pipeline of multiple hardware stages for encoding. An intermediate result is provided from at least one of the hardware stages to an encoding control module that processes the intermediate result to determine configuration instructions for a next hardware stage in the pipeline. The configuration instructions can be injected back into the encoder through one of the intermediate re-entry points. Thus, the encoding process can be modified dynamically through hardware and software interactions as the media stream progresses through the pipeline of the encoder.

In another embodiment, the encoding control module can decide to bypass a hardware stage based on CPU bandwidth and/or user requirements.

In yet another embodiment, the encoder can be part of a transcoder that includes a decoder and a digital signal processor. The decoder decodes an input media stream. The digital signal processor modifies the media stream by performing at least one or more of the following operations: changing color spaces, smoothing, locating scene changes, etc. The encoder can then encode the modified media stream by using entropy encoding. The resultant encoded media stream can have a different bit rate than the input media stream so that it may be used on a consumer that desires a specified bit rate.

The foregoing features and advantages of the invention will become more apparent from the following detailed description, which proceeds with reference to the accompanying figures.

BRIEF DESCRIPTION OF THE DRAWINGS

FIG. 11 is a flowchart illustrating the encoding control module bypassing at least one stage of the hardware encoder.

DETAILED DESCRIPTION

Figure 1:
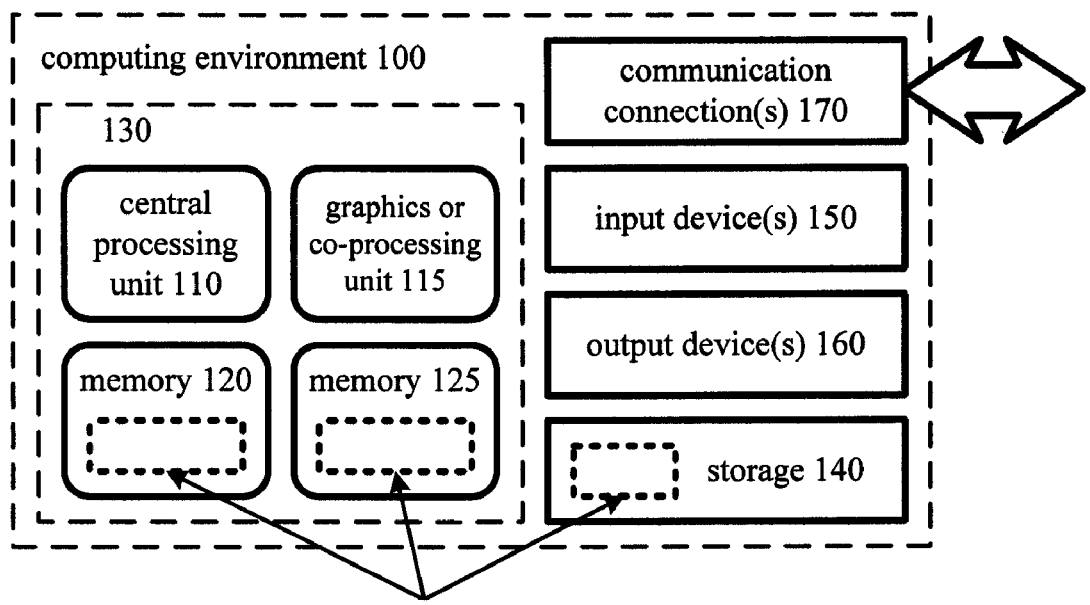
FIG. 1 is a block diagram illustrating a generalized example of a suitable computing environment in which several of the described embodiments can be implemented.

FIG. 1 illustrates a generalized example of a suitable computing environment 100 in which several of the described embodiments may be implemented. The computing environment 100 is not intended to suggest any limitation as to scope of use or functionality, as the techniques and tools may be implemented in diverse general-purpose or special-purpose computing environments.

With reference to FIG. 1, the computing environment 100 includes at least one CPU 110 and associated memory 120 as well as at least one GPU or other co-processing unit 115 and associated memory 125 used for video acceleration. In FIG. 1, this basic configuration 130 is included within a dashed line. The processing unit 110 executes computer-executable instructions and may be a real or a virtual processor. In a multi-processing system, multiple processing units execute computer-executable instructions to increase processing power. A host encoder or decoder process offloads certain computationally intensive operations (e.g., fractional sample interpolation for motion compensation, in-loop deblock filtering) to the GPU 115. The memory 120, 125 may be volatile memory (e.g., registers, cache, RAM), non-volatile memory (e.g., ROM, EEPROM, flash memory, etc.), or some combination of the two. The memory 120, 125 stores software 180 for an encoder environment implementing one or more of the encoder innovations described herein. As shown, the software 180 can be stored in any one of a variety of memory locations or can distributed across memory locations, depending on the design.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, DVDs, or any other medium which can be used to store information and which can be accessed within the computing environment 100. The storage 140 stores instructions for the software 180.

The input device(s) 150 may be a touch input device such as a keyboard, mouse, pen, or trackball, a voice input device, a scanning device, or another device that provides input to the computing environment 100. For audio or video encoding, the input device(s) 150 may be a sound card, video card, TV tuner card, or similar device that accepts audio or video input in analog or digital form, or a CD-ROM or CD-RW that reads audio or video samples into the computing environment 100. The output device(s) 160 may be a display, printer, speaker, CD-writer, or another device that provides output from the computing environment (100).

The communication connection(s) 170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 100, computer-readable media can include memory 120, storage 140, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "decide," "make" and "get" to describe computer operations in a computing environment. These terms are high-level abstractions for operations performed by a computer, and should not be confused with acts performed by a human being. The actual computer operations corresponding to these terms vary depending on implementation.

Figure 2:
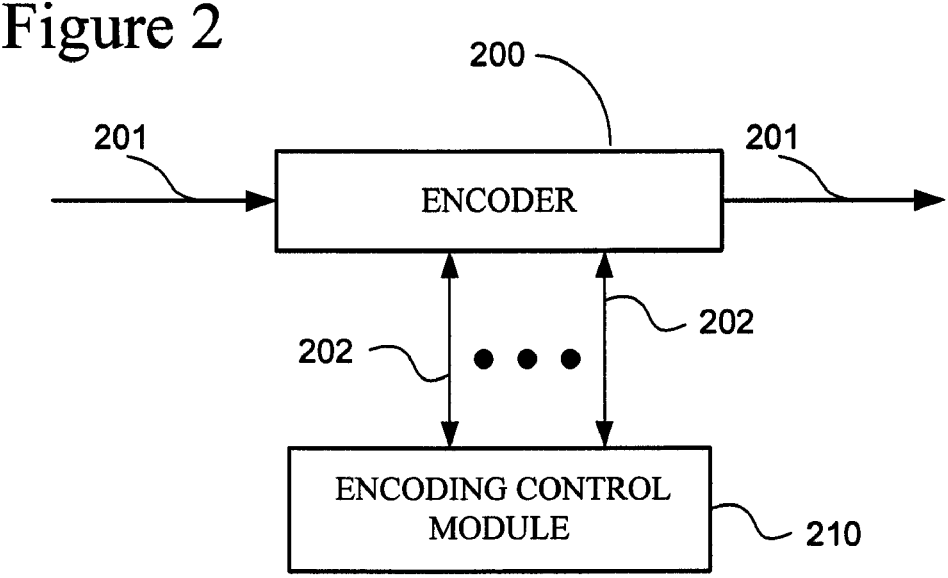
FIG. 2 is an encoder with multiple re-entry and exit points for external control by an encoding control module.

FIG. 2 shows a high level diagram of an encoder 200 that includes primary entry and exit points for receiving and delivering a media stream. Additionally, the encoder includes multiple secondary re-entry and exit points as illustrated at 202 for control by an encoding control module 210. The encoder of FIG. 2, and other embodiments herein, can be located on a client or server computer (such as the type of FIG. 1), or other types of machines that require encoding. As further described below in the encoder example of FIG. 4, the encoder includes a pipeline of several functional hardware modules that perform the encoding process. Each individual hardware module can have a specific entry and exit interface and procedure associated therewith. The pipeline can operate in an asynchronous fashion as different individual modules can take on tasks related to different pictures, picture segments, or frames of a media stream. Intermediate entry and exit points 202 allow external and dynamic software control by the encoding control module 210. The encoding control module 210 can be responsible for setting task priorities and issuing tasks and configuration information to the different stages in the encoder. For example, tasks that tend to block execution of other tasks can receive higher priority. For example, a task related to coding a reference picture can typically receive higher priority than that of a non-referenced picture. The encoding control module 210 can further track tasks as the encoding process continues through the pipeline. To issue a task at a re-entry point, the encoding control module 210 can first query the encoder 200 for the status of the pipeline for the picture, the picture segment or frame. The encoder 200 can then respond by storing the data requested in a memory location for retrieval by the encoding control module. The encoding control module 210 can then upload the data from the memory and compute new control parameters needed for continued execution of the encoding process. Such control parameters can be delivered to the encoder through an intermediate re-entry point so that the encoder 200 can continue to execute the necessary task in the pipeline.

In the proposed encoder architecture, it is optionally possible to turn on and off entry and exit points based on hardware capability and preferred system settings. Additionally, the encoding control module 210 can decide to bypass certain hardware modules in the pipeline and operate in a software mode for corresponding tasks. In this way, the encoder can take full advantage of hardware acceleration modules while maintaining the best quality through close software control. Such a structure allows flexible software control of the encoder to maximize the encoding procedure.

Figure 3:
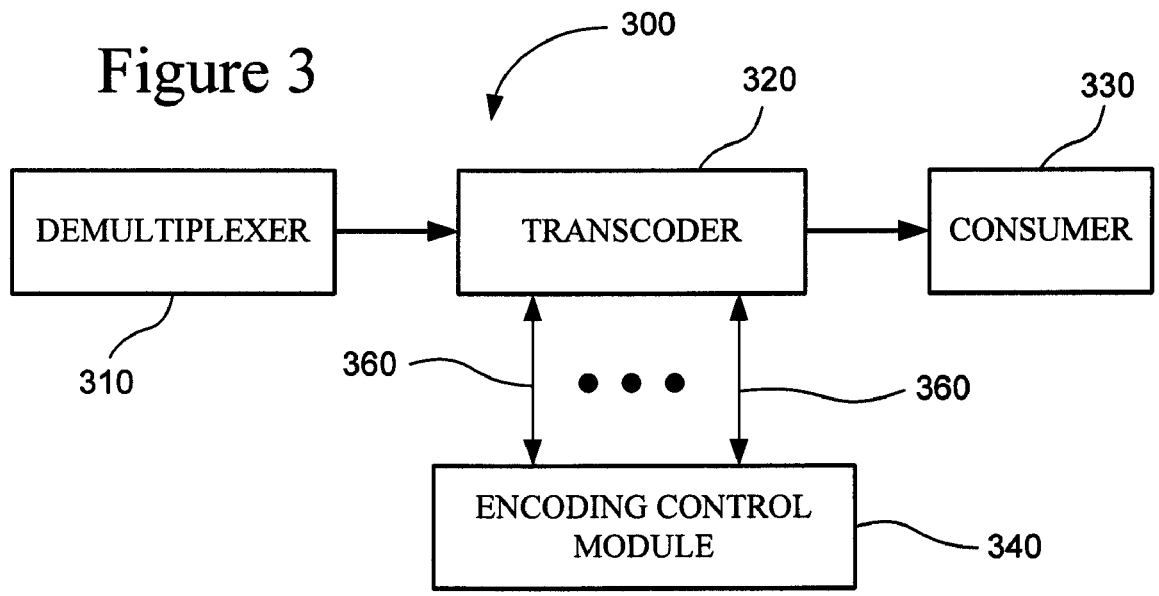
FIG. 3 is a system view using the encoding control module in conjunction with a transcoder.

FIG. 3 shows a system view 300 in which the encoder of FIG. 2 can be used. A demultiplexer 310 receives a multimedia stream (video and audio) and separates the video from audio for individual processing. For purposes of illustration, only the video portion of the processing is shown. However, audio encoding can be achieved using a similar and parallel path. The demultiplexed video stream is input into a transcoder 320. As further described below, the transcoder includes a decoder, a digital signal processor (DSP) and an encoder, and can be used for encoding the video stream for deliverance to a consumer 330. The consumer can be a wide variety of devices that typically require media data having predetermined requirements. For example, if the consumer 330 is a mobile phone, it generally requires a lower bit-rate media stream than if the consumer is a high-powered computer. In any event, an encoding control module 340 can interact with the transcoder 320 to dynamically control the encoder, as further described below. Multiple secondary re-entry and exit points shown at 360 allow dynamic and interactive control of the transcoder by the encoding control module 340 during the encoding process. The system 300 thereby allows conversion of the multi-media stream to a desired format for the consumer 330. It should be noted that the consumer 330 can be coupled to the transcoder 320 through a network (e.g., Internet) or a wireless connection.

Figure 4:
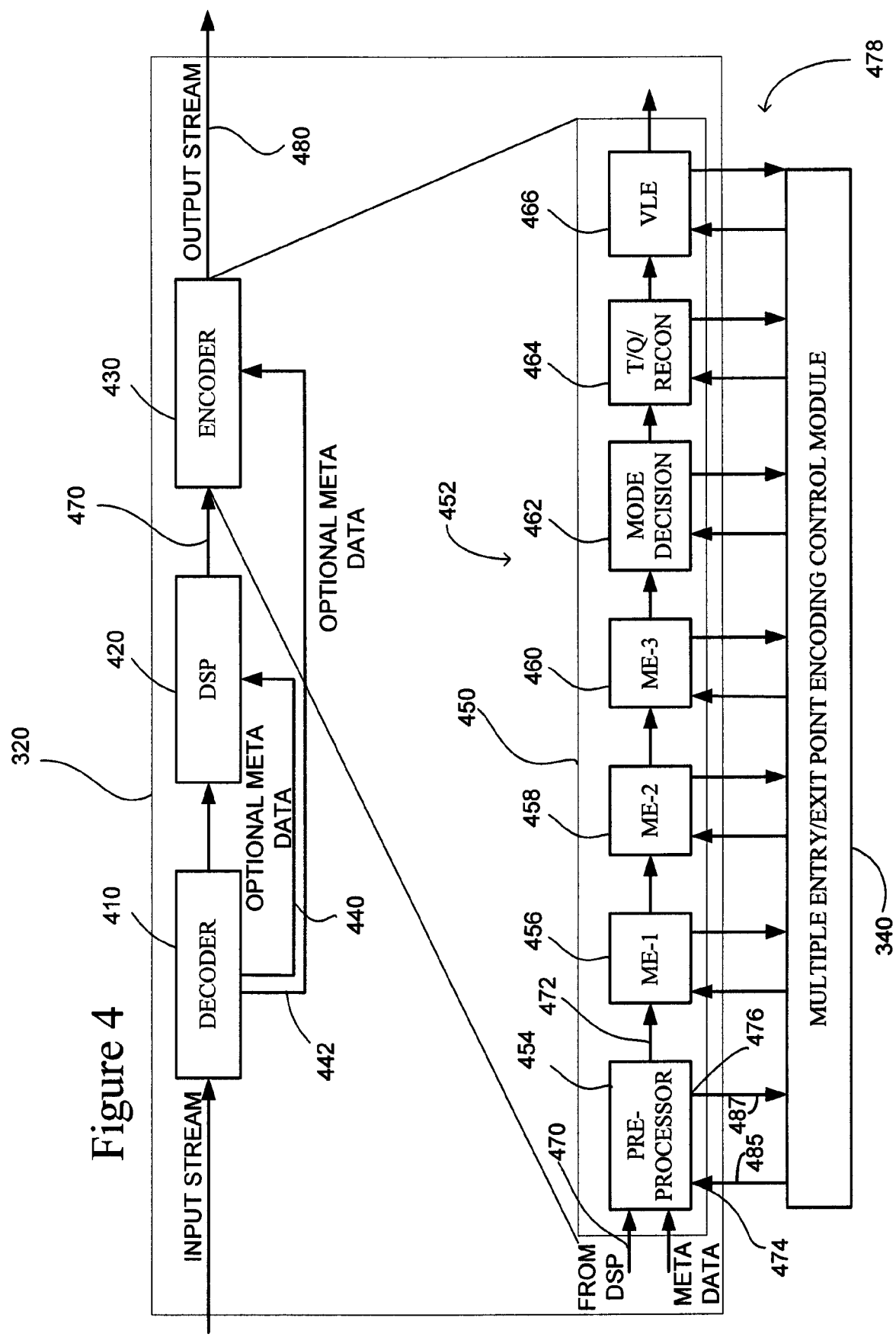
FIG. 4 is a detailed hardware diagram illustrating a transcoder having multiple hardware stages in its encoder portion.

FIG. 4 shows a detailed hardware diagram of parts of the system 300 of FIG. 3. It should be recognized that the transcoder 320 of FIG. 4 can have parts thereof used independently. For example, the encoder, shown in FIG. 4, can be used separately from the transcoder, as was illustrated above in FIG. 2. However, to reduce the complexity of this description, the detailed view of the encoder is shown only in FIG. 4. Those skilled in the art will recognize that the encoder of FIG. 4 can be used with the other embodiments described herein.

The transcoder 320 includes a decoder 410, a digital signal processor (DSP) 420, and an encoder 430. One function of the transcoder is to dynamically change the bit-rate of the input stream (received through a primary input) in order to meet with constraints of a consumer. The decoder 410 decodes the input stream so that it can be manipulated and later encoded. Decoders are well understood in the art and need not be further described. The decoder may generate optional metadata shown at 440 and 442 that can be provided to the DSP 420 and the encoder 430, respectively. Such metadata can be used to assist the DSP or the encoder to perform more efficiently. For example, the decoder may have information that can be useful to the encoding process, such as search information that the encoder can use for encoding frames related to motion. The DSP 420 is coupled to the output of the decoder 410 and can perform a wide variety of functions, as is well understood in the art. Some example functions of the DSP include changing color spaces, smoothing, finding scene changes, etc. The DSP 420 can also inform the encoder 430 of various scene changes, frame modes, etc.

The encoder 430 generally performs entropy encoding, which can include variable length encoding, arithmetic encoding, etc. The internals of the encoder 430 are shown in detail at box 450 and include multiple hardware stages 452 coupled in series in a pipeline fashion. The various hardware stages are only for purposes of illustration and some of the stages may be eliminated or other stages added. Nonetheless, the stages include a preprocessor 454, a motion estimation-1 (ME-1) module 456, a motion estimation-2 (ME-2) module 458, a motion estimation-3 (ME-3) module 460, a mode decision module 462, a transform-and-quantization-reconstruction module 464, and an entropy encoding module 466 (shown as a variable length encoding module). The first module in the pipeline is the preprocessor module 454 that receives input from the DSP 420 and the optional metadata 442 from the decoder 410. The preprocessor 454 generally decides the picture type through analysis of the frames, determines scene changes and bit-rate allocation. The primary input and exit point for the preprocessor are shown at 470 and 472, respectively. The preprocessor also includes secondary re-entry and exit points at 474 and 476 that allow for dynamic control by the encoding control module 340. The multiple re-entry and exit points 474, 476 allow for communication lines 485, 487 to be coupled in parallel to the encoding control module 340. As further described below, multiple of the hardware stages 452 have re-entry and exit communication lines coupled in parallel to the encoding control module 340, as indicated at 478. Each re-entry and exit point of the hardware stage 452 is not individually numbered for ease of illustration. The preprocessor output 472 is coupled in series to the ME-1 module 456. The ME-1 module 456 identifies image motions between frames so that coding redundancy can be reduced. Generally ME-1 performs a high-level rough estimation of the coding redundancy, whereas later ME stages are for further refining the coding redundancy. In prior encoders, the preprocessor results would automatically be passed to the ME-1 stage 456 and no other options were provided. However, FIG. 4 shows that the intermediate re-entry and exit points 474, 476 can be used by the encoding control module 340 to further manipulate the preprocessing step and provide further instructions to the ME-1 stage 456. For example, the encoding control module 340 can instruct the ME-1 hardware stage 456 to act on the data from the preprocessor 454 in a certain manner, such as directing the ME-1 module 456 to perform a motion search with a large search window. Alternatively, the ME-1 module 456 can perform a motion search with a small area of the frame for low-motion frames. Furthermore, the encoding control module 340 can instruct the ME-1 module 456 when to terminate the search based on the encoding quality, the CPU bandwidth, user requirements, etc.

Thus, the multiple re-entry and exit point communication lines of the motion estimation module, shown generally at 478, allow the encoding control module 340 to determine how to proceed with the next frame in the media stream based on the appropriate budget. For example, the encoding control module can adjust the time of search in order to increase the speed of the overall encoding process. Alternatively, the encoding control module can increase the search time in order to improve quality of the overall encoding. The raw data from the ME-1 module 456 is passed to the ME-2 module 458. As previously described, the ME-2 module 458 operates on motion vectors on a finer scale and with more accuracy. Consequently, the software in the encoding control module 340 operates on ME-2 differently than ME-1 because the goal of ME-1 is to find motion in a frame, whereas the goal of ME-2 is to find a pixel in a region where there is motion. ME-2 is shown with intermediate re-entry and exit points (shown generally at 478) that allow the encoding control module to further manipulate and instruct the ME-2 module how to behave. The output of ME-2 is coupled in series to ME-3 shown at 460.

ME-3 is generally used for one-quarter pixel resolution, and can be bypassed if the encoding control module 340 so desires. Thus, the encoding control module 340 can instruct the ME-3 460 that the data provided from ME-2 458 is to be passed directly to the mode decision stage 462. Such a decision can be made by the encoding control module 340 based on whether the resolution is satisfactory in view of the CPU budget and user requirements. Additionally, communication between the ME-3 module and the encoding control module occurs using the intermediate entry and exit point communication lines 478. In mode decision stage 462, each frame is divided into blocks that include a 16×16 pixel window, although other block sizes can be used. A motion search is performed in each block using a reference frame. A motion vector is thereby generated and a coding mode is determined in order to minimize the bits used and to maximize the coding quality. The mode decision stage 462 can be performed in hardware, as shown at box 462, or the encoding control module 340 can decide to perform the mode decision on its own based on the current state of the processing. Communication between the mode decision stage 462 and the encoding control module 340 occurs using the intermediate entry and exit communication lines 478. In any event, the mode decision stage 462 has an output coupled to the T/Q/recon stage 464. The T/Q/recon stage performs transformation, quantization and reconstruction of frames, as is well understood in the art. The transformation can perform a Fast Fourier Transform (FFT) or a Discrete Cosine Transform (DCT) on the various pixels depending on the particular type of encoding performed. In the quantization phase of the T/Q/recon, a weighted average is calculated by using parameters provided from the encoding control module 340 provided via the entry and exit points 478 of the T/Q/recon module. Thus, quantization parameters are passed from the encoding control module 340 to the T/Q/recon module 464 depending on the desired accuracy, quality, bandwidth and user input. The final hardware stage 466 is labeled as the variable length encoding module, but any desired entropy encoding module can be used, such as arithmetic encoding. Again, through the secondary and intermediate entry and exit point communication lines 478, the encoding control module 340 can manipulate the encoding performed in the VLE hardware stage 466. The final stage 466 then delivers, on the primary output, the output stream, shown at 480, that is provided to the consumer 330 (FIG. 3).

Figure 5:
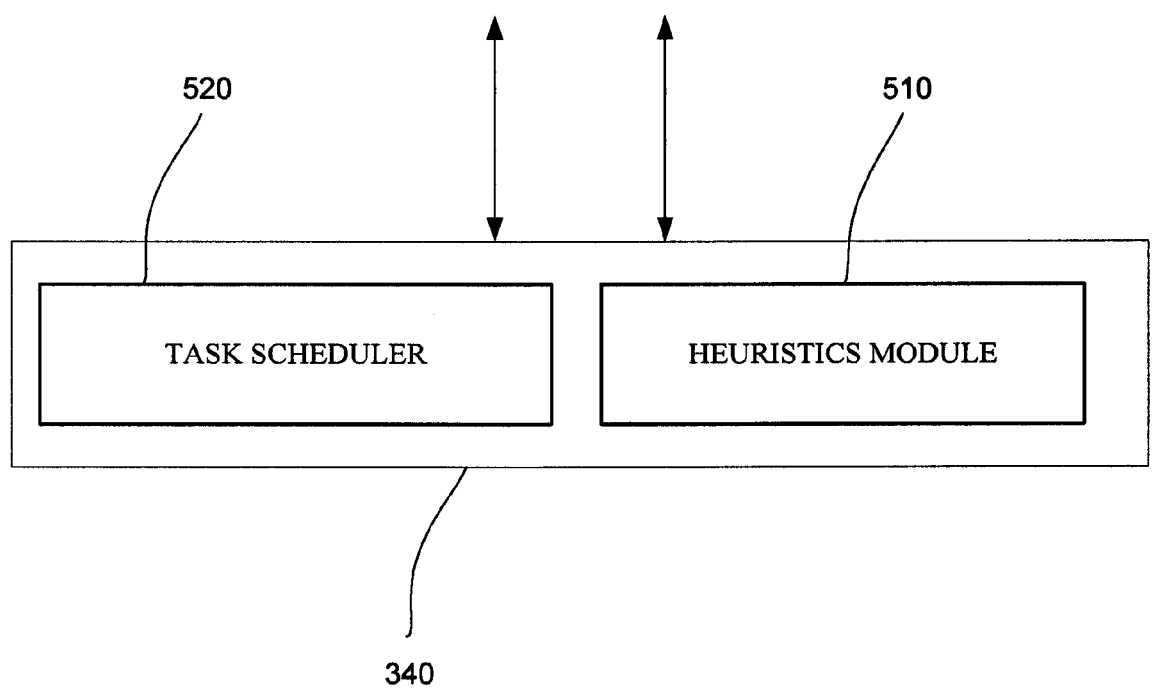
FIG. 5 shows a detailed diagram of the encoding control module.

FIG. 5 shows further details of the encoding control module 340 that can be used. The encoding control module 340 may include a heuristics module 510 and a task scheduler 520. The heuristics module 510 makes decisions on which parameters and configurations to pass to each of the hardware stages 452 via the entry and exit points on each hardware stage. Additionally, the heuristics module decides whether stages should be bypassed or whether functions of those stages should be performed in software in the encoding control module 340. The task scheduler 520 prioritizes different tasks that are performed in the various hardware stages 452 and provides direction to the hardware stages so that intelligent encoding decisions can be made. When the heuristics module 510 decides to bypass certain hardware modules in order to perform the corresponding tasks in software, it informs the hardware stage that the operation will be performed in software. As a result, the hardware stage can turn off its operation and bypass results to the next hardware stage under the control of the encoding control module 340. Another option is that the full hardware pipeline can be used without software interaction. In such a case, all intermediate exit and entry points can be disabled. The heuristics module and task scheduler can operate in parallel on the various hardware stages 452 so that multiple encoding sessions can occur simultaneously in an efficient manner. Thus, different hardware modules 452 can execute different tasks from different encode sessions. The encoding control module can control the overall pipeline and negotiate with the encoder 430 based on its capability.

Figure 6:
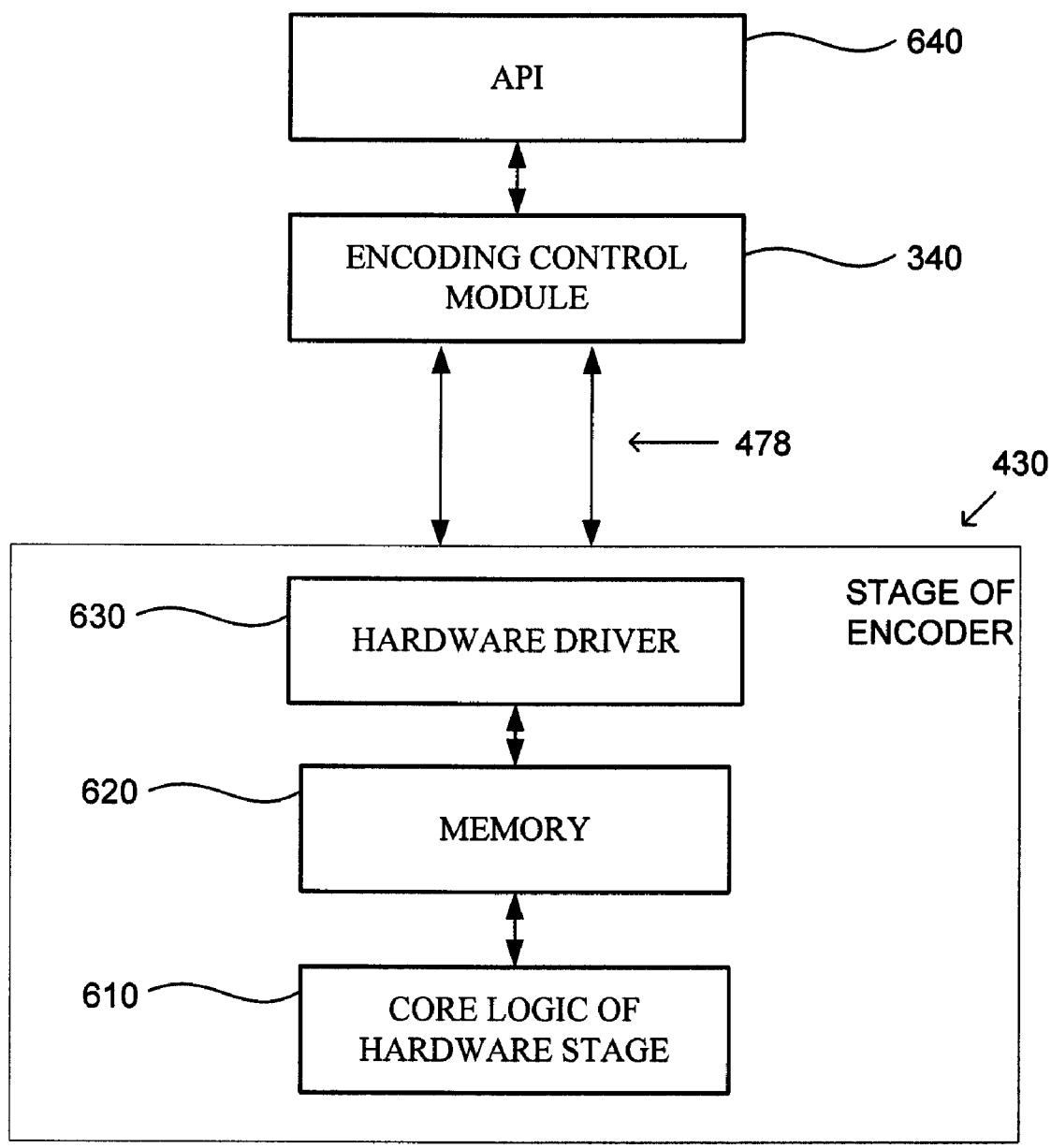
FIG. 6 is a diagram illustrating an API used in conjunction with the encoder.

FIG. 6 shows further details of hardware that can be used in some embodiment in each stage of the encoder 430. Although the encoder 430 is described in relation to FIG. 6, the encoder 200 of FIG. 2 can also include the hardware described in FIGS. 5 and 6. Each stage includes core logic 610 that performs the operations described above, a memory 620 used to pass data and instructions between the encoding control module 340 and each stage of the encoder 430, and a hardware driver 630 coupled to the memory 620 and positioned between the memory and the encoding control module 340. The multiple entry and exit point communication lines are shown at 478 and allow communication from the encoding control module 340 to the hardware driver 630. Optionally, an application programming interface (API) 640 can be coupled to the encoding control module 340 to allow communication with an application (not shown). A set of API functions can be defined based on the proposed asynchronous pipeline structure to decouple the software and hardware design and development efforts. To minimize the effort required of the software in data manipulation, the output data from an exit point of a hardware module could be structured as the same or partially identical to the input data format at an entry point of the next hardware module in the acceleration pipeline. For example, the ME-1 output data format could be largely identical to the ME-2 input format. Nonetheless, the API 640 allows user requirements to be sent to the encoding control module 340 assisting in making decisions about the overall encoding process.

Figure 7:
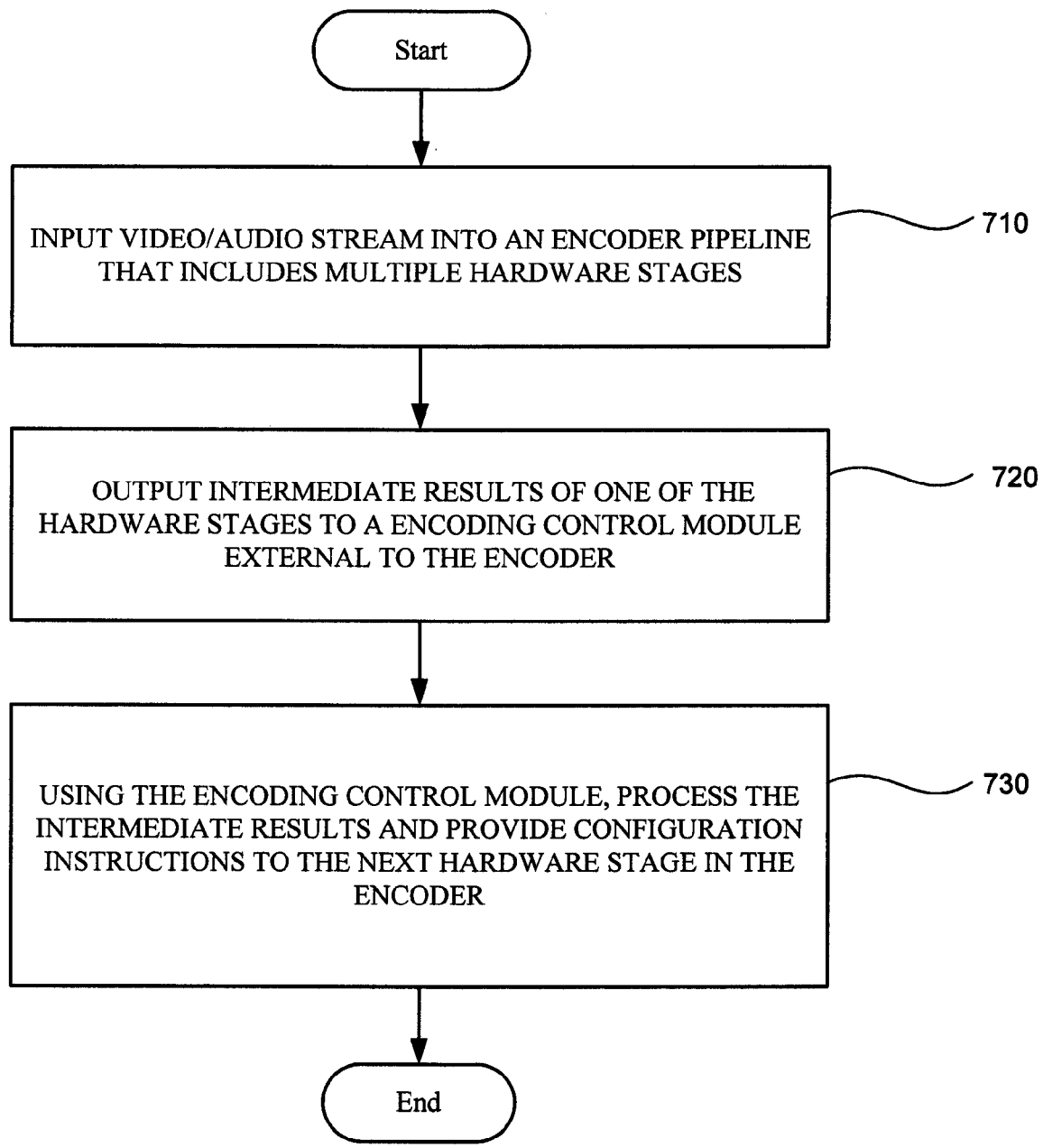
FIG. 7 is a flowchart illustrating the interaction between an encoding control module and an encoder.

FIG. 7 is a flowchart illustrating the interaction between the encoding control module and the multiple hardware stages. In process block 710, the input video/audio stream is received by the encoder pipeline that includes multiple hardware stages with intermediate entry and exit points for communication to the encoding control module. In process block 720, intermediate results of one of the hardware stages are sent to the encoding control module that is external to the encoder. In process block 730, the encoding control module processes the intermediate results and provides configuration instructions to the next hardware stage in the encoder. Thus, using this process, the hardware is broken down into modules so that the software can control particular hardware tasks. This allows the overall operation and control to be enhanced. Different tasks can be accomplished in hardware or software in a flexible manner. An additional advantage is that upgrades can easily be made to the encoding control module simply by downloading new software into the task scheduler 520 or the heuristics module 510. Parts of the hardware module that have been historically inefficient can be accomplished in software in the encoding control module, while efficient and heavyweight tasks can still be performed in hardware as was traditionally done.

Figure 8:
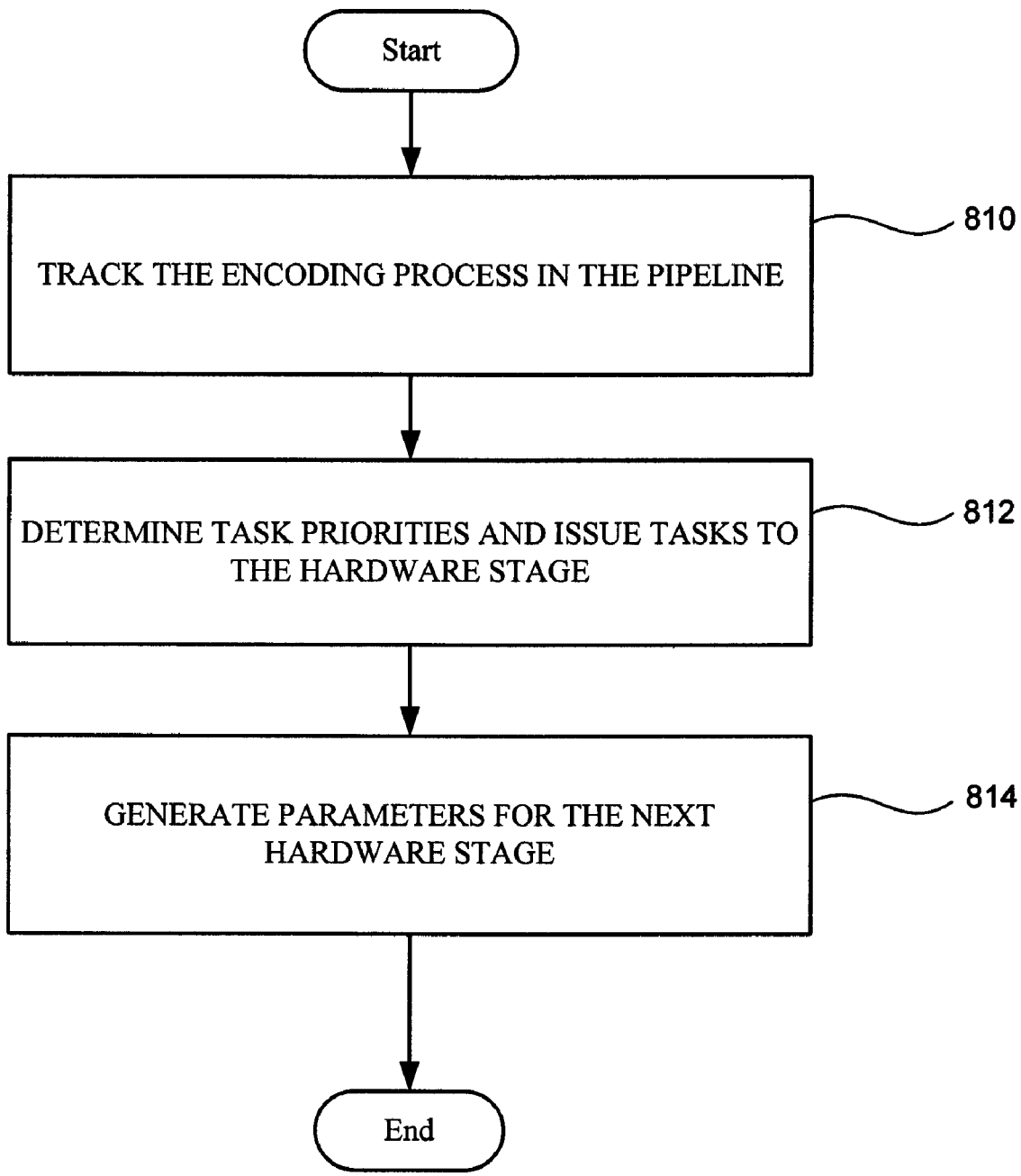
FIG. 8 is a flowchart illustrating functions performed by the encoding control module.

FIG. 8 is a flowchart illustrating some of the tasks performed by the encoding control module 340. In process block 810, the encoding control module tracks the encoding process in the pipeline. In process block 812, the encoding control module determines task priorities and issues tasks to the hardware stages based on its analysis. In process block 814, the encoding control module generates parameters for the next hardware stage in the pipeline. Additionally, the encoding control module can adjust parameters on all of the hardware stages based on past results. Thus, the configuration of the hardware modules is continually updated so that efficiency can be optimized.

Figure 9:
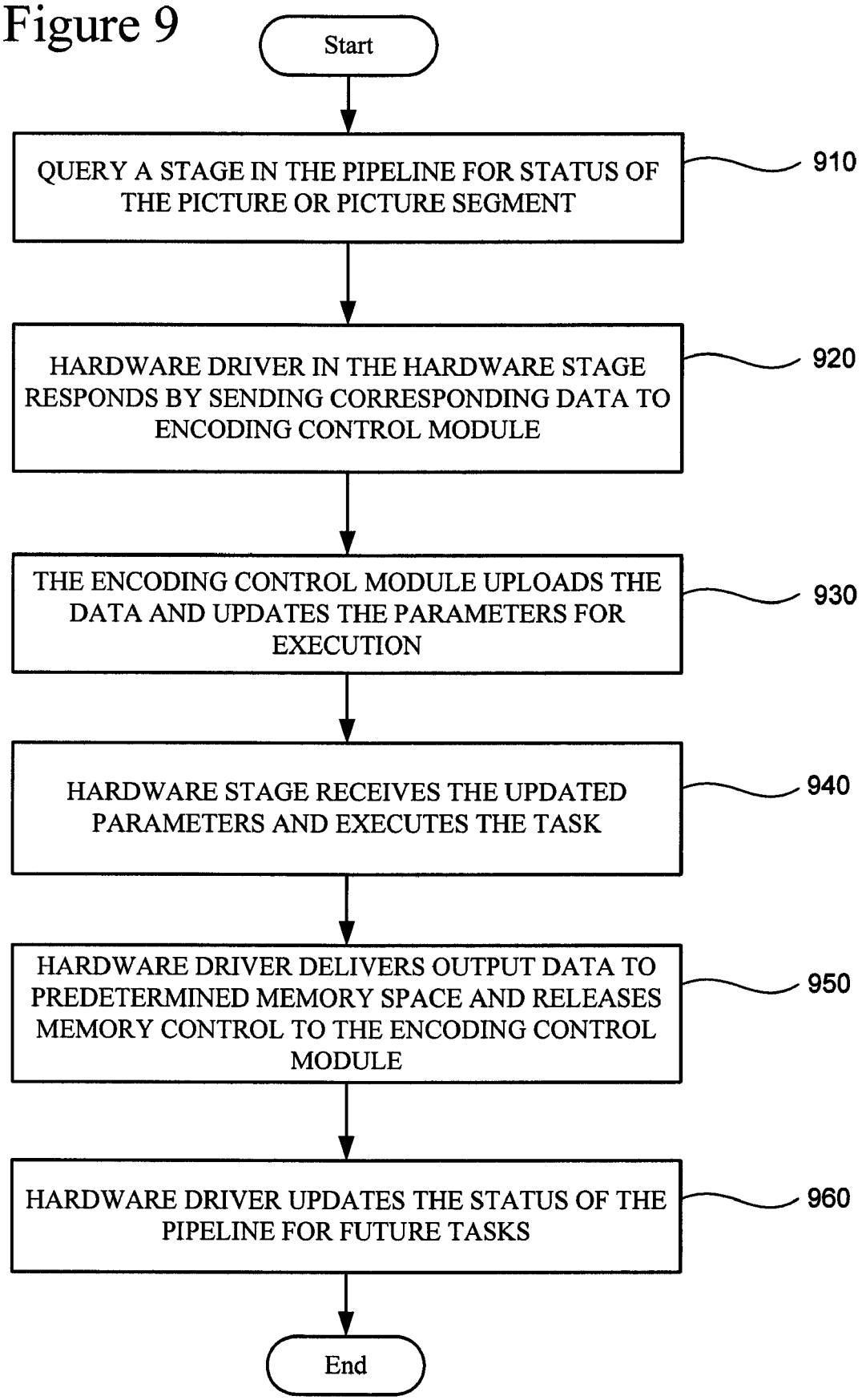
FIG. 9 is a flowchart illustrating communication between the encoding control module and a hardware stage of the encoder using a hardware driver.

FIG. 9 shows a flowchart illustrating communication between the encoding control module and the various hardware stages in the encoder 430. In process block 910, the encoding control module queries a stage in the pipeline for status of a picture or picture segment. This communication is passed via the signal lines shown at 478 to a hardware driver 630 located within the encoder stage. The hardware driver 630 allows the encoding control module to access a memory 620 located within the stage of the encoder. Thus, the hardware driver can respond to the query by sending the corresponding data found in memory 620 to the encoding control module. In process block 930, the encoding control module uploads the data sent by the hardware driver and processes the data to determine parameters needed for execution by the next hardware stage. In process block 940, the hardware stage receives the updated parameters and executes its tasks in conjunction with the associated parameters. In process block 950, the hardware driver delivers the resultant data to the predetermined memory space and releases memory control to the encoding control module. In process block 960, the hardware driver updates the status of the pipeline for future tasks.

Figure 10:
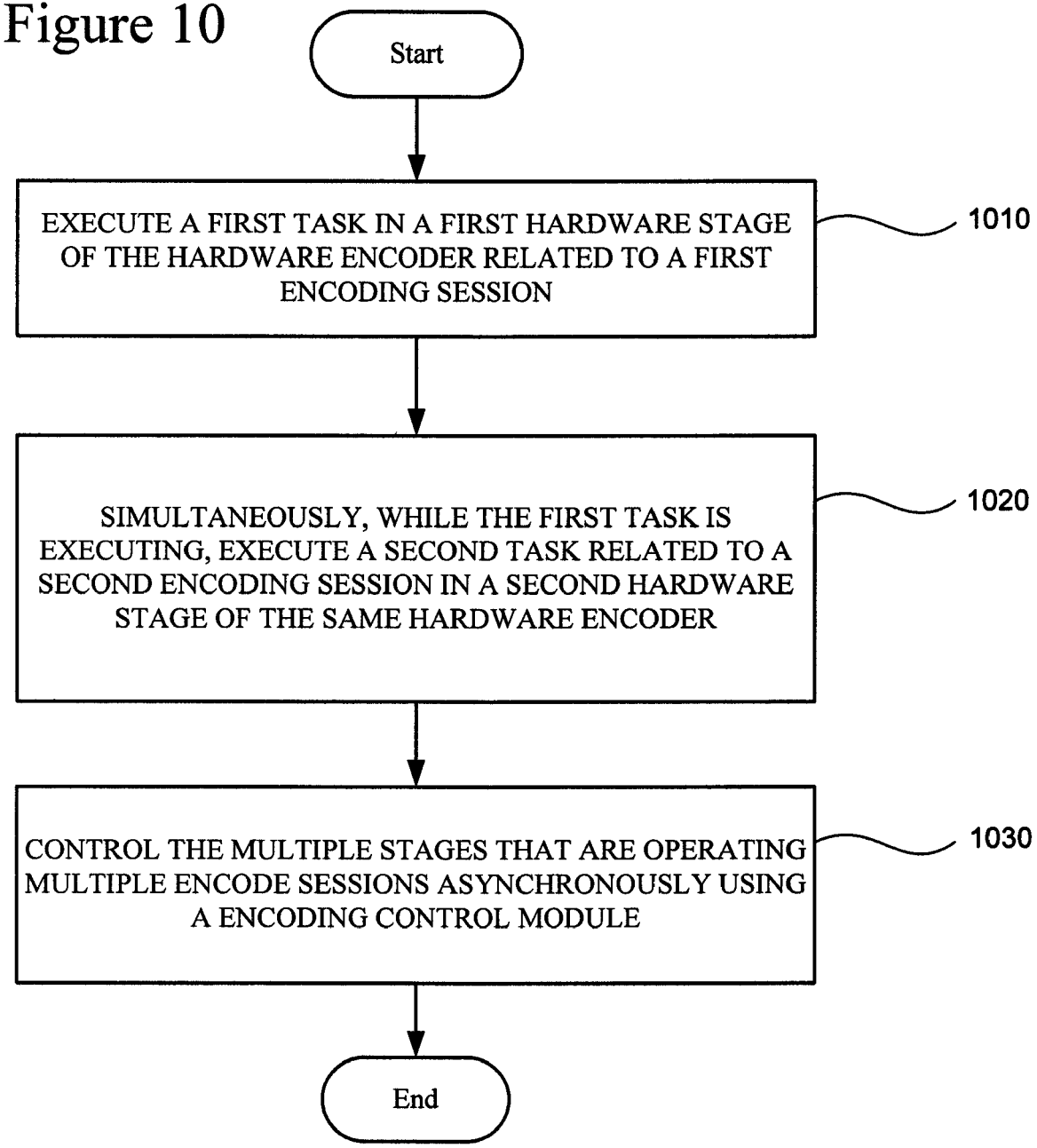
FIG. 10 is a flowchart illustrating multiple encoding sessions being encoded simultaneously and asynchronously.

FIG. 10 shows a flowchart illustrating multiple sessions being encoded simultaneously. In process block 1010, a first task is executed in a first hardware stage of the hardware encoder related to a first encoding sessions. In process block 1020, while the first encoding session continues to be processed, a second task related to a second encoding session is executed in a second hardware stage of the same hardware encoder. In process 1030, control of the multiple stages, that are processing multiple code sessions asynchronously, is performed by the encoding control module. Thus, asynchronous encoding can be used to support multiple encoding sessions simultaneously in an efficient manner. The different encoding sessions can be unrelated to each other allowing portions of the encoder to perform an encoding session and other portions of the encoder to perform an unrelated encoding session simultaneously. Such asynchronous encoding can be performed in the multiple hardware stages of encoder 430.

FIG. 11 shows a flowchart illustrating another feature of the encoding control module 340. In process block 1100, data is received in a hardware stage of the encoder. In process block 1110, the encoding control module determines based on the received data, CPU bandwidth, and/or user requirements to bypass a stage in the hardware encoder. Examples of stages that are more typically bypassed include the ME-3 hardware module 460 and the mode decision module 462. In process block 1120, once it is decided to skip a stage in the hardware encoder, the encoding control module passes control to the next stage in the encoder by instructing the bypassed stage to pass data directly through to the next stage without further processing.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of encoding a media stream, comprising:
receiving a media stream into an encoder that includes a pipeline of multiple hardware stages for encoding;
outputting an intermediate result from at least one of the hardware stages;
reading the intermediate result into an encoding control module and processing the intermediate result to determine configuration instructions for a next hardware stage in the pipeline; and
providing the determined configuration instructions to the next hardware stage in the pipelines;
bypassing a hardware stage in the pipeline based, at least in part, on the intermediate results;
wherein the multiple hardware stages are coupled in series and include at least a pre-processor hardware stage that determines a bit rate allocation designated to a media stream frame, a motion estimation hardware stage that analyzes motion occurring between frames, and an encoding hardware stage that performs entropy encoding to provide the encoded output stream.

2. The method of claim 1, wherein bypassing is further based on bandwidth of the central processing unit and user requirements.

3. The method of claim 1, further including decoding the media stream in a decoder and providing the decoded stream to a digital signal processor coupled between the decoder and the encoder.

4. The method of claim 1, wherein the encoding control module is a software module.

5. The method of claim 3, further including receiving metadata in the encoder provided by the decoder.

6. The method of claim 5, wherein the metadata is used by the encoder to more efficiently search the media stream.

7. The method of claim 1, wherein the media stream includes video data or audio data.

8. The method of claim 1, wherein the hardware stages include one or more of the following individual stages: a preprocessor stage, a first and second motion estimation stage, a mode decision stage, a transformation and quantization stage and an entropy encoding stage.

9. The method of claim 1, wherein the encoder changes the media stream from a first bit rate to a second bit rate.

10. The method of claim 1, wherein the encoding control module includes a heuristic module and a task scheduler.

11. An apparatus for encoding a media stream, comprising:
an encoder for receiving a media stream and outputting an encoded version of the media stream, the encoder including multiple hardware stages coupled in series to form a pipeline, at least two of the hardware stages having secondary entry and exit points; and
an encoder control module coupled to the secondary entry and exit points of the at least two hardware stages so that the hardware stages are coupled in parallel to the encoder control module, wherein each hardware stage includes core logic, a hardware driver coupled to the secondary entry and exit points, and a memory coupled between the core logic and the hardware driver, the encoder control module being able to access the memory via the hardware driver;
wherein the multiple hardware stages include a pre-processor hardware stage that receives the media stream and determines bit rate allocation to designate to a frame of the media stream, a motion estimation hardware stage coupled in series to the preprocessor hardware stage that analyzes motion occurring between frames in the media stream, and an encoding hardware stage coupled in series to the motion estimation hardware stage and that performs entropy encoding on the media stream to provide the encoded output stream.

12. The apparatus of claim 11, wherein the encoder control module includes a heuristics module and a task scheduler.

13. The apparatus of claim 11, further including an application program interface coupled to the encoder control module.

14. The apparatus of claim 11, wherein the apparatus further includes a decoder and a digital signal processor coupled between the decoder and the encoder.

15. A method for encoding a media stream, comprising:
receiving the media stream into a decoder and decoding the media stream;
modifying the decoded media stream using digital signal processing;
receiving the modified media stream and encoding the media stream using a multi-stage hardware encoder having multiple entry and exit points;
controlling the multi-stage hardware encoder using a software-based encoding control module that dynamically modifies the encoding process during encoding;
receiving in the multi-stage hardware encoder, meta data from the decoder, the meta data relating to how the decoder decoded the media stream; and
the multi-stage hardware encoder including at least two motion estimation stages coupled in series, the at least two motion estimation stages having entry and exit points which are coupled in parallel to the software-based encoding control module to allow individual control of the motion estimation stages and including a preprocessor hardware stage coupled to at least one of the motion estimation stages that receives the media stream and determines a bit rate allocation to designate to a frame of the media stream, and an encoding hardware stage coupled to at least one of the motion estimation hardware stages that performs entropy encoding on the media stream to provide the encoded output stream.

16. The method of claim 15, wherein the encoding modifies the bit rate of the media stream.

17. The method of claim 15, further including modifying the encoding control module using an application program interface.

* * * * *